(12) United States Patent
Kyoukane et al.

(10) Patent No.: US 10,705,382 B2
(45) Date of Patent: Jul. 7, 2020

(54) LIGHTING DEVICE AND DISPLAY DEVICE

(71) Applicant: SHARP KABUSHIKI KAISHA, Sakai, Osaka (JP)

(72) Inventors: Youzou Kyoukane, Sakai (JP); Takeshi Masuda, Sakai (JP); Hisashi Watanabe, Sakai (JP); Hirotoshi Yasunaga, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/685,882

(22) Filed: Nov. 15, 2019

(65) Prior Publication Data

US 2020/0159073 A1 May 21, 2020

Related U.S. Application Data

(60) Provisional application No. 62/769,226, filed on Nov. 19, 2018.

(51) Int. Cl.
*G09F 13/04* (2006.01)
*G09F 13/08* (2006.01)
*G02F 1/13357* (2006.01)

(52) U.S. Cl.
CPC .. *G02F 1/133608* (2013.01); *G02F 1/133603* (2013.01); *G02F 1/133605* (2013.01)

(58) Field of Classification Search
CPC ...................................... G02F 1/1333–133606

USPC .................................. 362/97.1–97.4, 249.02
See application file for complete search history.

(56) References Cited

U.S. PATENT DOCUMENTS

2011/0292316 A1    12/2011   Fujimoto et al.

FOREIGN PATENT DOCUMENTS

JP        2011-248120 A      12/2011

*Primary Examiner* — Jason M Han
(74) *Attorney, Agent, or Firm* — ScienBiziP, P.C.

(57) ABSTRACT

[Object] To provide a lighting device and a display device that can prevent contact between a reflective sheet having a metal film and solder firmly fixed to terminal areas of LEDs that are disposed in LED openings of the reflective sheet.

[Solution] A lighting device 10 includes: a plurality of LEDs 15 serving as backlight light sources; an LED substrate 11 mounted with the plurality of LEDs 15; a reflective sheet 12 having a plurality of LED openings 13 in which the plurality of LEDs 15 are disposed, respectively, and having a metal film on a surface of the reflective sheet 12 opposite to a surface of the reflective sheet 12 that faces the LED substrate 11; and a support 17 that supports the reflective sheet 12 at a higher position than a height of solder 16 firmly fixed to terminal areas of the LEDs 15 that face the LED substrate 11.

11 Claims, 6 Drawing Sheets

LIGHTING DEVICE AND DISPLAY DEVICE

TECHNICAL FIELD

The present invention relates to a lighting device including a reflective sheet having a metal film and a display device.

BACKGROUND ART

In the field of backlights of liquid crystal displays, there has been a growing extent of products designed to pursue high image quality and high luminance by enhancing contrast by individually controlling the amounts of emission of LEDs (light-emitting diodes) through the use of local dimming driving that partially controls LEDs. There has been a demand for reductions in thickness of backlights, and in the field of direct-type backlights, there has been a demand for substantial reductions in size of LEDs. For this reason, a technique by which to mount small-sized LEDs (hereinafter referred to as "mini-LEDs") of a very small size of, for example, 0.2 mm×0.2 mm has come into use.

In general, for higher light efficiency of LEDs, a direct-type backlight is configured such that a reflective sheet is placed on an LED substrate mounted with a plurality of LEDs and the LEDs are disposed in LED opening holes formed in the reflective sheet, with the result that light is reflected by the reflective sheet. Moreover, in the pursuit of high luminance and high image quality, there has been a demand for the prevention of a decrease in luminance that is caused by expansion and contraction of the reflective sheet. For this reason, it has been known that the reflective sheet is retained by a fixing member bored through the LED substrate to attach the reflective sheet and the LED substrate to each other and, by making an LED opening hole located farther away from the fixing member larger than an LED opening hole located closer to the fixing member, the holes in the reflective sheet are prevented from being displaced from the positions of the LEDs (PTL 1).

CITATION LIST

Patent Literature

[PTL 1] Japanese Unexamined Patent Application Publication No. 2011-248120

SUMMARY OF INVENTION

Technical Problem

In a case where a reflective sheet is placed on an LED substrate mounted with mini-LEDs, smaller LED opening holes are provided in the reflective sheet, and the LED opening holes are placed at narrower spacings (in the case of LEDs measuring 0.2 mm per side, pitches of 1 to 2 mm). The reflective sheet is often formed by resin and therefore easily expands and contracts under heat. For this reason, in comparison with LEDs of a conventional size, even slight expansion and contraction may displace the holes of the reflective sheet from the positions of the mini-LEDs. In that case, the mini-LEDs may be covered by the reflective sheet. Even when the mini-LEDs are not covered by the reflective sheet, solder having adhered to the edges of LED openings and LED terminal areas and partially strayed may make contact with the reflective sheet.

However, in a case where an electrically-conductive material such as a silver sheet is used as the reflective sheet for higher efficiency in the use of light, this contact undesirably creates the risk of a short circuit.

On the other hand, as in the case of the lighting device described in PTL 1, it is also conceivable that the holes may be made uniformly larger so that the LEDs are not hidden even when the reflective sheet expands and contracts. However, doing so makes a reflective area small due to the largeness of the holes, leading to a decrease in luminance of the backlight. Further, it is also conceivable that the reflective sheet may be fixed by the fixing member; however, in a case where the backlight is very thin in thickness or in a case where there is no space for the fixing member due to the narrow pitches between the LEDs, it is impossible to use the fixing member, which is a separate component.

Further, aside from this, in the case of mini-LEDs, the LED openings are small and the pitches are narrow; therefore, it is necessary to use a roller or the like to uniformly paste the reflective sheet to the LED substrate via the LEDs without air bubbles. In this case, since the LEDs are very small and, accordingly, areas of paste of the reflective sheet to the LED substrate, i.e. scattered areas of contact between the reflective sheet and the LED substrate are small, the reflective sheet easily peels off when pressed by the roller, and this also leads to breakage of the LEDs.

The present invention has as an object to provide a lighting device and a display device that can prevent contact between a reflective sheet having a metal film and solder firmly fixed to terminal areas of LEDs that are disposed in LED openings of the reflective sheet.

Solution to Problem (1) One embodiment of the present invention is directed to a lighting device including: a plurality of LEDs; an LED substrate mounted with the plurality of LEDs; a reflective sheet having a plurality of LED openings in which the plurality of LEDs are disposed, respectively, and having a metal film on a surface of the reflective sheet opposite to a surface of the reflective sheet that faces the LED substrate; and a support that supports the reflective sheet at a higher position than a height of solder firmly fixed to terminal areas of the LEDs that face the LED substrate.

(2) Further, an embodiment of the present embodiment is directed to the lighting device according to the configuration (1) described above, wherein the support is formed on the surface of the reflective sheet that faces the LED substrate.

(3) Further, an embodiment of the present embodiment is directed to the lighting device according to the configuration (1) described above, wherein the support is formed on a surface of the LED substrate that faces the reflective sheet.

(4) Further, an embodiment of the present embodiment is directed to the lighting device according to the configuration (3) described above, wherein the support is constituted by part of a resist formed on a surface of the LED substrate that faces the reflective sheet or constituted a member separate from the resist formed on the surface of the LED substrate that faces the reflective sheet.

(5) Further, an embodiment of the present embodiment is directed to the lighting device according to the configuration (3) or (4) described above, further including an optical member, wherein the reflective sheet has a plurality of support openings, and the support includes at least two types of supports of different heights including supports of a higher height that pass through the support openings and support the optical member and supports of a lower height that support the reflective sheet.

(6) Further, an embodiment of the present embodiment is directed to the lighting device according to the configuration (1) described above, further including an optical member, wherein the reflective sheet has a plurality of support openings, the support passes through the support openings, projects from the surface of the reflective sheet that faces the LED substrate and the surface of the reflective sheet opposite to the surface, and is fixed to the reflective sheet, and a support projecting from the surface of the reflective sheet opposite to the surface of the reflective sheet that faces the LED substrate supports the optical member.

(7) Further, an embodiment of the present embodiment is directed to the lighting device according to the configuration (1) described above, further including an optical member, wherein the support projects from identical positions on the surface of the reflective sheet that faces the LED substrate and the surface of the reflective sheet opposite to the surface and is fixed to the reflective sheet, and a support projecting from the surface of the reflective sheet opposite to the surface of the reflective sheet that faces the LED substrate supports the optical member.

(8) Further, an embodiment of the present embodiment is directed to the lighting device according to any one of the configurations (1) to (7) described above, the support is adhesive ink or a printing adhesive material.

(9) Further, an embodiment of the present embodiment is directed to the lighting device according to any one of the configurations (1) to (8) described above, the support takes a form of a columnar projection.

(10) Further, an embodiment of the present embodiment is directed to the lighting device according to any one of the configurations (1) to (8) described above, the support takes a form of a grid projection.

(11) Further, an embodiment of the present embodiment is directed to a display device including: the lighting device according to any one of the configurations (1) to (10) described above; and a display panel.

Advantageous Effects of Invention

One aspect of the present invention brings about an effect of providing a lighting device and a display device that can prevent contact between a reflective sheet having a metal film and solder firmly fixed to terminal areas of LEDs that are disposed in LED openings of the reflective sheet.

DESCRIPTION OF EMBODIMENTS

Embodiment 1

Figure 1:
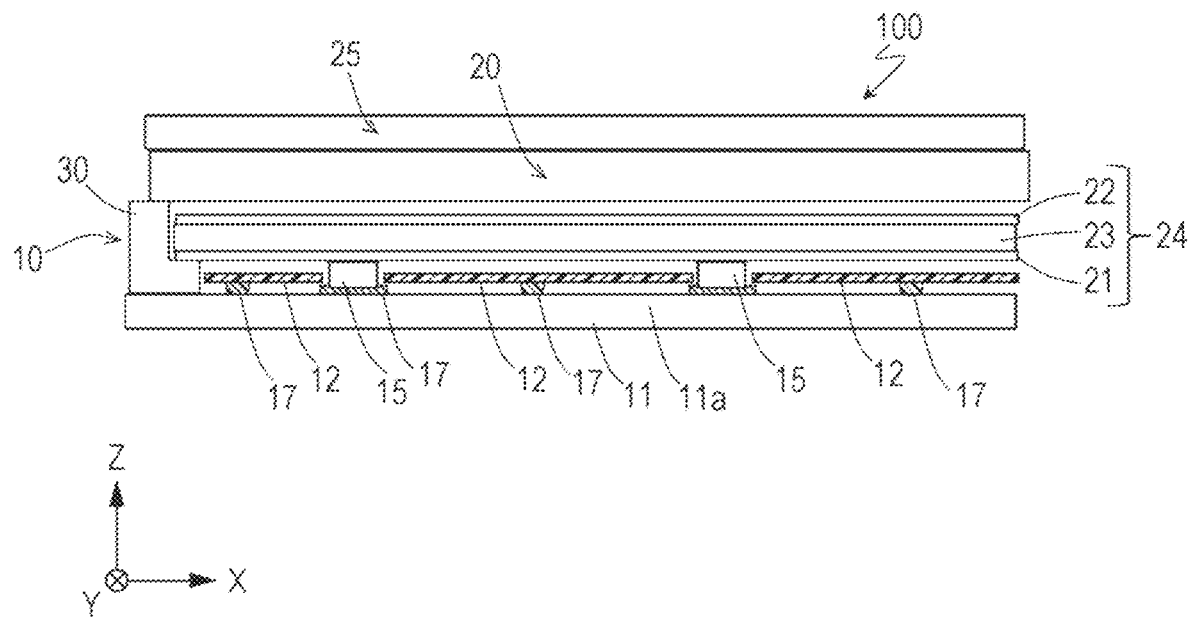
FIG. 1 is a schematic cross-sectional view showing a configuration of main components of a display device including a lighting device according to Embodiment 1 of the present invention.
Figure 2:
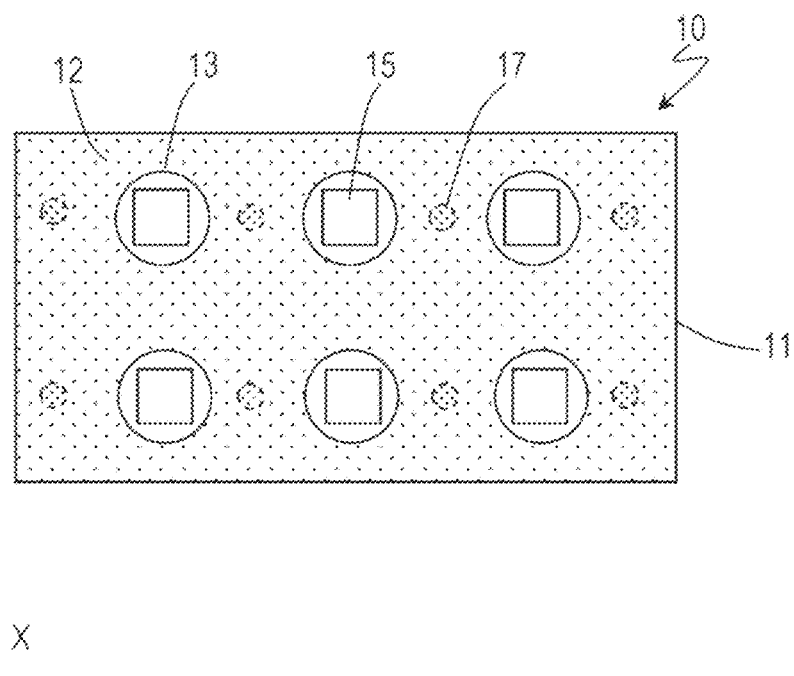
FIG. 2 is a schematic plan view showing a configuration of main components of the lighting device.
Figure 3:
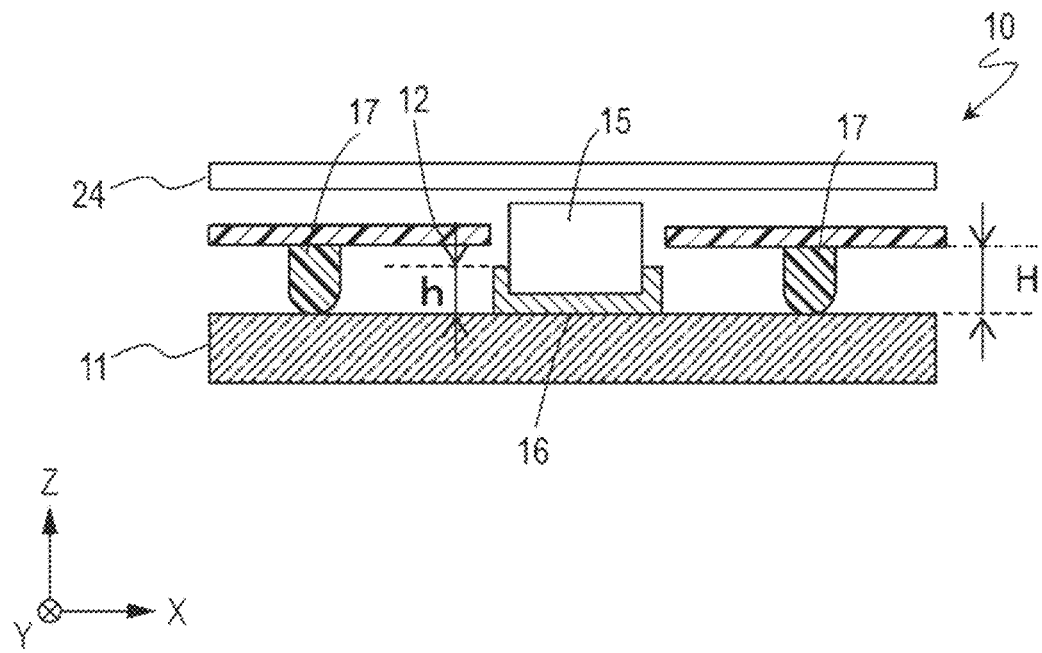
FIG. 3 is a schematic cross-sectional view showing the configuration of the main components of the lighting device.

A first embodiment of the present invention is described below with reference to FIGS. 1 to 3. FIG. 1 is a schematic cross-sectional view showing a configuration of main components of a liquid crystal display device including a direct-type backlight serving as a local-dimming-type lighting device according to an embodiment of the present invention. FIG. 2 is a schematic plan view showing a configuration of main components of the lighting device. FIG. 3 is a schematic cross-sectional view showing the configuration of the main components of the lighting device.

As shown in FIG. 1, a liquid crystal display device 100 of the present embodiment includes a liquid crystal display panel 20 and a lighting device 10. On a display surface (in FIG. 1, an upper surface) of the liquid crystal display panel 20, a touch panel (TP) and a transparent protective member 25 such a cover glass (CG) may be provided.

The lighting device 10 is a direct-type backlight including LEDs 15 on a side (in FIG. 1, a lower side) thereof opposite to the display surface of the liquid crystal display panel 20. Disposed between the liquid crystal display panel 20 and the LEDs 15 is an optical member 24 including an optical sheet 22, a diffusion sheet 23, and a wavelength conversion sheet 21. The optical sheet 22, the diffusion sheet 23, and the wavelength conversion sheet 21 are stacked in this order from the liquid crystal display panel 20 toward the LEDs 15.

In general, the optical sheet 22 includes two prism sheets disposed so that a plurality of grooves are substantially orthogonal to each other. The diffusion sheet 23 is made of polycarbonate or acrylic resin. It should be noted that the wavelength conversion sheet 21 may be omitted. Provided below the optical member 24 are a plurality of light-emitting diodes (LEDs) 15 serving as backlight light sources for the liquid crystal display panel 20.

The plurality of LEDs 15 are arranged two-dimensionally (e.g. in rows and columns). The LEDs 15 includes top-view-light-emitting-type chips, and by packaging the LEDs 15 with transparent resin, LEDs with wide directional characteristics that also emit light from the side are employed. The LEDs 15 are sized to be small-sized LEDs (hereinafter referred to as "mini-LEDs" as needed) of a very small size of, for example, 0.1 mm in height and 0.2 mm×0.2 mm in length and breadth.

The LEDs 15 are mounted at pitches of 1 to 2 mm on an LED substrate 11, which is constituted by a rigid substrate made of glass epoxy resin or a flexible printed circuit board (FPC), through the use of solder. A frame 30 is disposed at ends of the LED substrate 11. The FPC is connected to a power-supply substrate or the like and applies a designated voltage to the LEDs 15 to cause the LEDs 15 to glow.

As shown in FIG. 1, a reflective sheet 12 is put on top of a surface of the LED substrate 11 on which the plurality of LEDs 15 are mounted. In general, the reflective sheet 12 is made of resin such as polyethylene terephthalate. The reflective sheet 12 has a thickness of approximately 60 to 80 μm. As shown in FIG. 2, the reflective sheet 12 has a plurality of LED openings 13 inside which the plurality of LEDs 15 are disposed, respectively. Although, in FIG. 2, the LED openings 13 are circular in shape, they may be rectangular or elliptical in shape. The LED openings 13 are meant to be holes through which to insert the LEDs 15.

The reflective sheet 12 has a highly reflective metal film (of aluminum, silver, or the like; not illustrated) deposited on a front side thereof.

Formed on a back side of the reflective sheet 12 provided with the LED openings 13 are supports 17 made of resin in the form of projections as shown in FIG. 1. The is, the supports 17 are formed on a surface of the reflective sheet 12 that faces the LED substrate 11. The supports 17 are made of a resin material such as polycarbonate, acrylic, or epoxy. The supports 17 are applied through the use of an ink-jet method or a screen printing method and formed by UV curing. In a case where an ink-jet printer is used, necessary heights of resin are formed in predetermined positions by moving a head back and forth several times. Normally, for ease of formation, it is conceivable that the supports 17 may be cylindrical in shape, but instead of being cylindrical, the supports 17 can be cuboidal or conical in shape. That is, the supports 17 of the present embodiment take the form of columnar projections.

As shown in FIG. 3, the height (H) of each of the supports 17 is made greater than the thickness (h) of solder 16 used for flip-chip mounting of the LEDs 15 to the LED substrate 11. With this, when the reflective sheet 12 with the supports 17 formed thereon is disposed in alignment with an LED mounting surface, the spacing between the back side of the reflective sheet 12 and the LED substrate 11 becomes greater than the thickness (h) of the solder 16. This gives a structure that avoids contact between the back side of the reflective sheet 12 and the solder 16. In the case of mini-LEDs, since the thickness (h) of the solder 16 is substantially 0.01 mm to 0.02 mm, it is desirable that heights of H≥0.05 mm be formed.

Moreover, even in the case of displacement of relative positions by thermal expansion due to the difference between the expansion coefficient of the reflective sheet 12 and the expansion coefficient of the LED substrate 11, the edges of the LED openings 13 and the solder 16 do not make contact with each other. As a result of this, a malfunction due to a short circuit does not occur.

Modification of Embodiment 1

For example, in a case where adhesive ink or a printing adhesive material is used as the resin material of which the supports 17 are made, the reflective sheet 12 can be uniformly disposed by bonding the LED substrate 11 and the reflective sheet 12 together.

In this case, a gluing surface present all over the reflecting sheet 12 allows easy entry of air bubbles during bonding. An attempt to uniformly paste the reflective sheet 12 through the use of a roller or the like in order to further reduce air bubble formation raises concern about breakage of the LEDs by the roller.

On the other hand, the formation of adhesive ink in a fine pattern prevents air bubbles from being trapped between the reflective sheet 12 and the LED substrate 11 when the reflective sheet 12 is pasted. As a result of this, since bonding is done by pressing only the resin portions thus applied, bonding is achieved with weak pressure. This makes it possible to uniformly paste the reflective sheet 12 to the LED substrate 11 while avoiding breakage of the LEDs 15.

As described above, a liquid crystal display device 100 according to the present embodiment includes: a liquid crystal display panel 20; a plurality of LEDs 15 serving as backlight light sources for the liquid crystal display panel 20, an LED substrate 11 mounted with the plurality of LEDs 15; a reflective sheet 12 having a plurality of LED openings 13 in which the plurality of LEDs 15 are disposed, respectively, and having a metal film on a surface of the reflective sheet 12 that faces the liquid crystal display panel 20; and a support 17 that supports the reflective sheet 12 at a higher position than a height h of solder 16 firmly fixed to terminal areas of the LEDs 15 that face the LED substrate 11.

According to the foregoing configuration, since the support 17 is provided between the LED substrate 11 and the reflective sheet 12 and the height of the support 17 is greater than the height h of the solder 16 firmly fixed to the terminal areas of the LEDs 15, the metal film of the reflective sheet 12 and the solder 16 do not make contact with each other even when the reflective sheet 12 expands and contracts. For this reason, a short circuit by contact can be prevented.

This makes it possible to provide a liquid crystal display device 100 that can prevent contact between a reflective sheet 12 having a metal film and solder 16 firmly fixed to terminal areas of LEDs 15 disposed in LED openings 13 of the reflective sheet 12.

Embodiment 2

Figure 4:
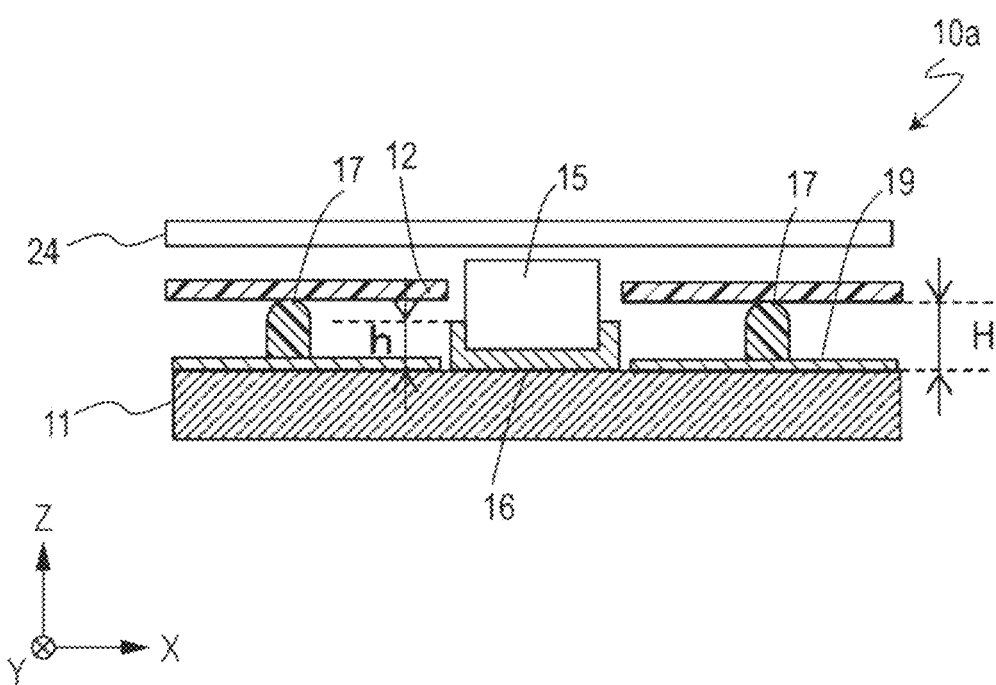
FIG. 4 is a schematic cross-sectional view showing a configuration of main components of a lighting device according to Embodiment 2 of the present invention.

Next, a lighting device constituted by a direct-type backlight of a second embodiment of the present invention is described with reference to FIG. 4. FIG. 4 is a schematic cross-sectional view showing a configuration of main components of a lighting device according to Embodiment 2 of the present invention.

The following describes a lighting device constituted by a direct-type backlight. The lighting device is substantially identical in basic configuration to the first embodiment described above but differs in that resin is formed on an LED substrate on which LEDs are mounted.

Accordingly, the following description describes differences in detail and omits to describe common features.

In a lighting device 10a of the present embodiment, as shown in FIG. 4, a white solder resist 19 that enhances reflective performance is applied to a surface of the LED substrate 11 in order to increase efficiency in the use of light.

In a case where an ink-jet printer is used, UV curing is done after full ink application, and curing is done after performing full application again with varying amounts of ink that is discharged. This is repeated several times to form the supports 17 by partially providing projections of a predetermined height on the solder resist 19 within the LED substrate 11 as shown in FIG. 4. That is, the supports 17 are formed on a surface of the LED substrate 11 that faces the reflective sheet 12. In this case, the supports 17 are constituted by members separate from the resist formed on the surface of the LED substrate 11 that faces the reflective sheet 12.

After mounting of the LEDs 15, the reflective sheet 12 is placed on the supports 17 constituted by parts of the solder resist 19. The height (H) of each of the supports 17 up to the top is made greater than the thickness (h) of the solder 16 used for mounting the LEDs 15 on the LED substrate 11.

This makes it possible to avoid contact between the back side of the reflective sheet 12 and the solder 16 thus mounted, as is the case with the first embodiment. Further, since the edges of the LED openings 13 and the solder 16 do not make contact with each other even when the reflective sheet 12 contracts and expands under the influence of heat, a malfunction due to a short circuit does not occur.

Modification of Embodiment 2

For example, the supports 17 can be constituted by parts of the resist formed on the surface of the LED substrate 11 that faces the reflective sheet 12.

Figure 5:
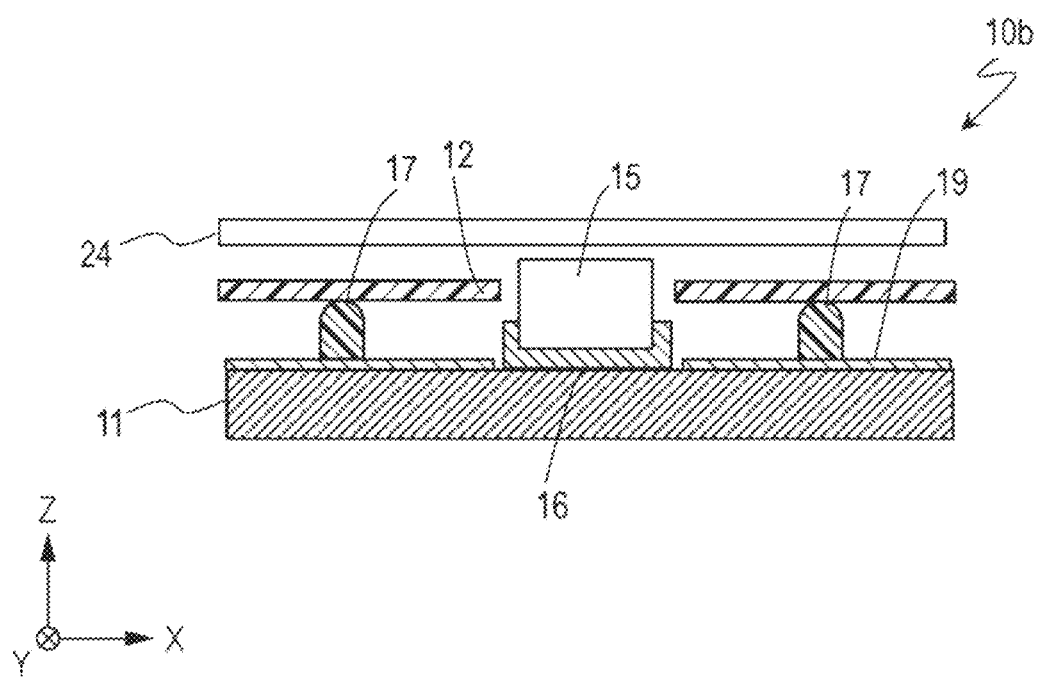
FIG. 5 is a schematic cross-sectional view showing part of a modification of the lighting device according to Embodiment 2 of the present invention.

Specifically, as shown in FIG. 5, supports 17 constituted by projections are formed by applying adhesive ink or a printing adhesive material onto a surface of the solder resist 19 instead of partially providing projections on the solder resist 19, and the reflective sheet 12 is placed and fixed by the adhesiveness of the supports 17. In a lighting device 10*b* of this embodiment, a sheet deflection and a sheet shear due to the influence of heat or the like can be suppressed by fixing the reflective sheet 12 to the supports 17 with adhesion.

Embodiment 3

Figure 6:
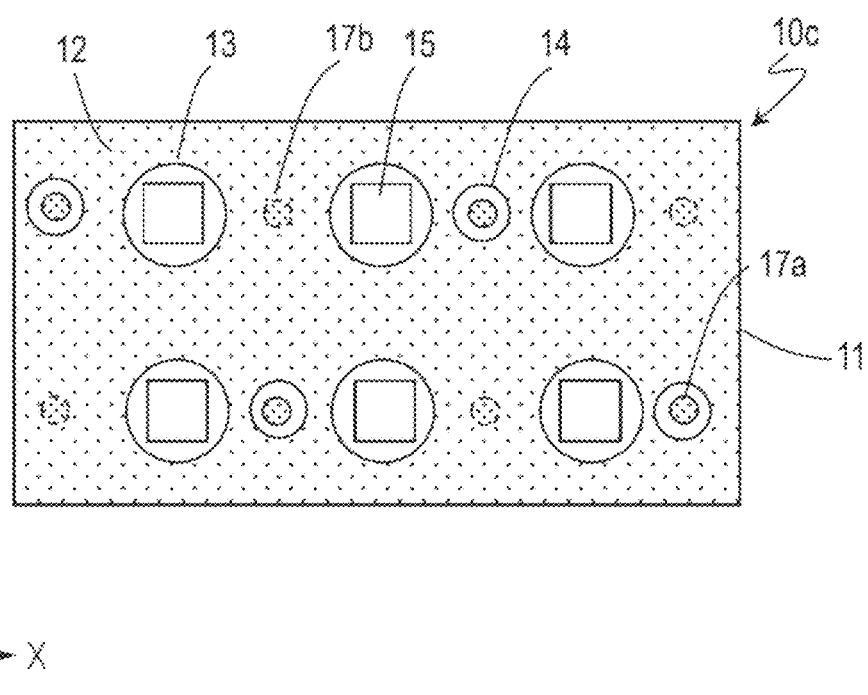
FIG. 6 is a schematic plan view showing a configuration of main components of a lighting device according to Embodiment 3 of the present invention.
Figure 7:
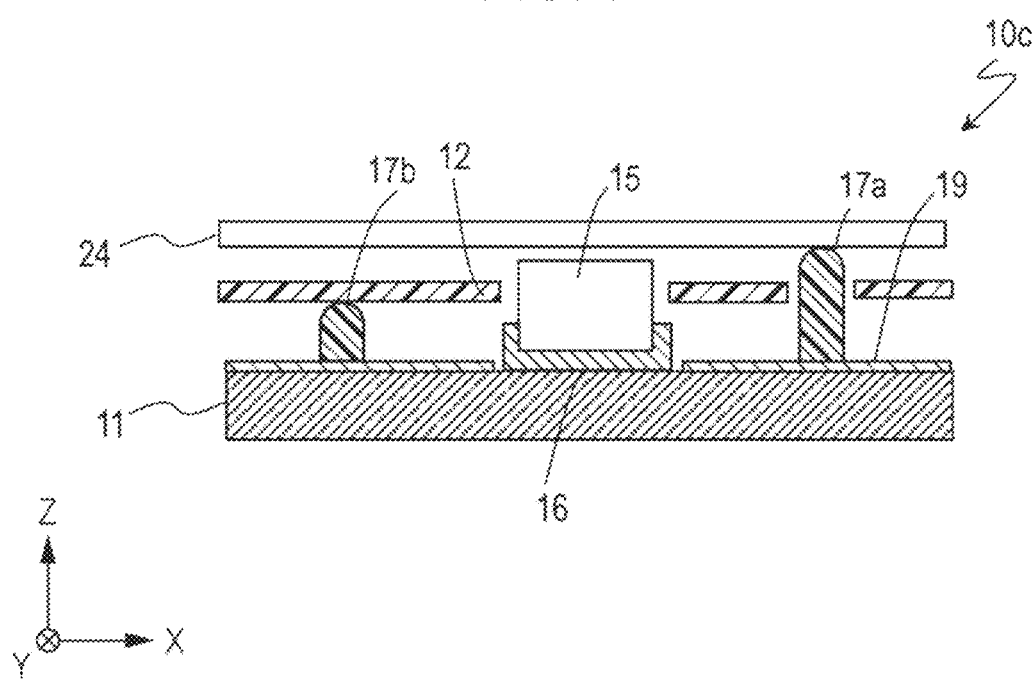
FIG. 7 is a schematic cross-sectional view showing the configuration of the main components of the lighting device.

A lighting device of the present embodiment is described with reference to FIGS. 6 and 7. FIG. 6 is a schematic plan view showing a configuration of main components of a lighting device according to the present embodiment. It should be noted that the optical member 24 is not illustrated. FIG. 7 is a schematic cross-sectional view showing the configuration of the main components of the lighting device.

The aforementioned first and second embodiments have described an example of use of supports constituted by projections that support a reflective sheet in order to avoid contact between a back side of the reflective sheet and a mounting solder surface.

The present embodiment describes a configuration having, in addition to supports constituted by projections that support a reflective sheet, a function of supporting an optical member disposed above the reflective sheet.

In a lighting device 10*c* of the present embodiment, as shown in FIG. 7, in a case where an ink-jet printer is used, a head is moved back and forth several times so that supports 17*a* and 17*b* of two types constituted by projections composed of resists of different heights in predetermined positions are formed on a surface of the LED substrate 11 on which the LEDs 15 are mounted.

As shown in FIG. 6, support openings 14 are separately provided in the reflective sheet 12 in addition to the LED openings 13, and as shown in FIG. 7, resist projections are disposed inside the support openings 14. As a result of this, the supports 17*a* and 17*b* of different heights are structured such that the supports 17*a* of a higher height pass through the support openings 14 and support the optical member 24 and the supports 17*b* of a lower height support the reflective sheet 12.

Disposing the optical member 24 on LED surfaces causes the optical member 24 to be scratched by contact with the LEDs 15 under operating conditions. This leads to the appearance of a luminous dot and the occurrence of demounting or the like of the LEDs 15, raising concern about failure of lighting. However, the occurrence of these malfunctions is reduced by eliminating contact between the LEDs 15 and the optical member 24 by supporting the optical member 24 with the supports 17*a* constituted by projections formed by the solder resist 19.

Modification of Embodiment 3

For example, the supports 17*a* and 17*b* constituted by two types of projections of different heights can be formed by applying adhesive ink or a printing adhesive material onto a surface of the solder resist 19 instead of partially providing projections on the solder resist 19.

In this case, the reflective sheet 12 is fixed by the support 17*b* of one type with the adhesiveness of the supports 17*b*, and the optical member 24 is fixed by the supports 17*a* of the other type. A sheet deflection and a sheet shear due to the influence of heat or the like can be suppressed by fixing the reflective sheet 12 and the optical member 24.

Embodiment 4

Figure 8:
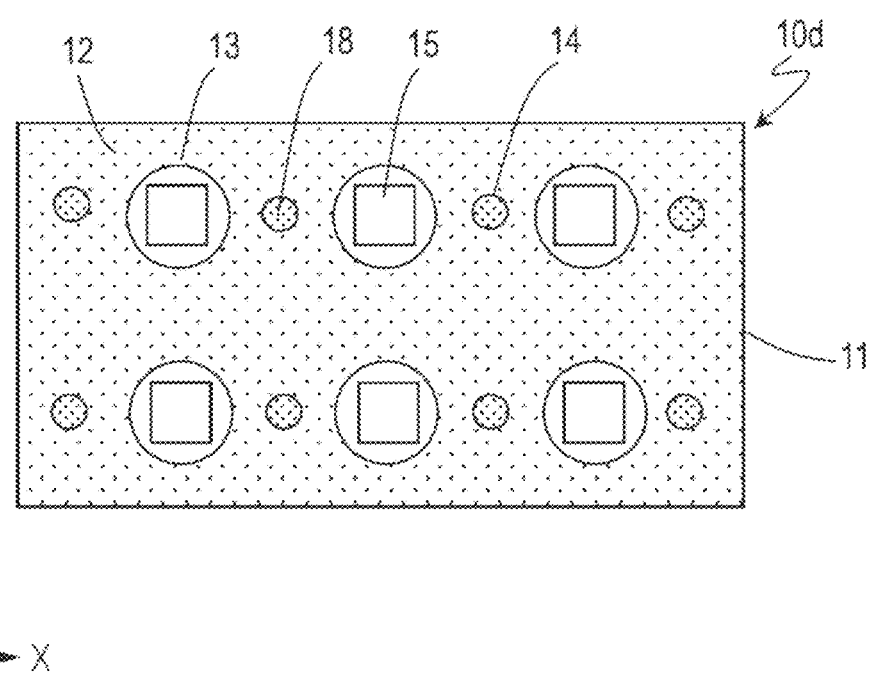
FIG. 8 is a schematic plan view showing a configuration of main components of a lighting device according to Embodiment 4 of the present invention.
Figure 9:
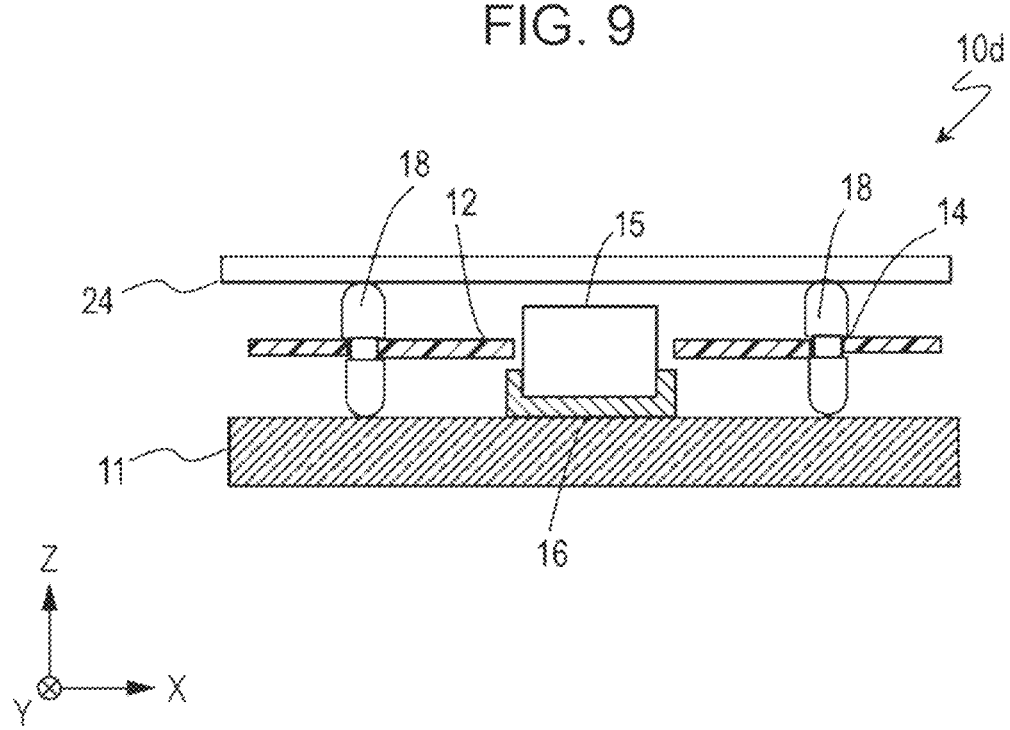
FIG. 9 is a schematic cross-sectional view showing the configuration of the main components of the lighting device.
Figure 10:
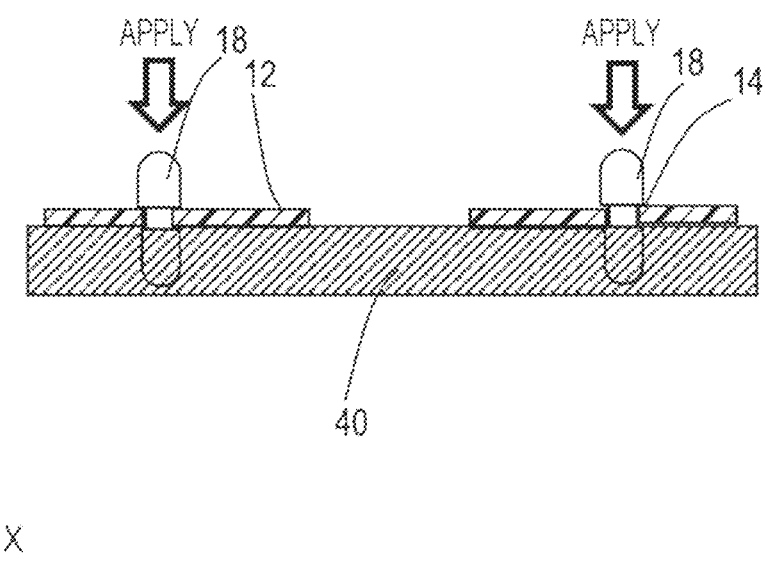
FIG. 10 is a schematic plan view showing a method for forming supports of the lighting device.

A lighting device 10*d* of a separate configuration of a support serving both as a mechanism that supports an optical member in a manner similar to the aforementioned third embodiment and a mechanism that supports a reflective sheet is described with reference to FIGS. 8 to 10. FIG. 8 is a schematic plan view showing a configuration of main components of a lighting device according to the present embodiment. It should be noted that the optical member 24 is not illustrated. FIG. 9 is a schematic cross-sectional view showing the configuration of the main components of the lighting device. FIG. 10 is a schematic plan view showing a method for forming supports of the lighting device.

As shown in FIG. 10, for example, the reflective sheet 12 is placed on a template 40 having projection-shaped holes. In so doing, the support openings 14 through which supports formed on the reflective sheet 12 pass and the projection shapes are made to planarly correspond to each other. In this state, resin is poured into the support openings 14 of the reflective sheet 12. The resin continues to be poured beyond a surface of the reflective sheet 12, whereby resin projections projecting upward from the reflecting sheet 12 are formed.

As shown in FIGS. 8 and 9, supports struts 18 serving as supports thus formed to project from upper and lower surfaces of the reflective sheet 12 are structured to support the optical member 24 and the reflective sheet 12.

Disposing the optical member 24 on surfaces of the LEDs 15 causes the optical member 24 to be scratched by contact with the LEDs 15 under operating conditions. This leads to the appearance of a luminous dot and the occurrence of demounting or the like of the LEDs 15, raising concern about failure of lighting. However, the occurrence of these malfunctions is reduced by eliminating contact between the LEDs 15 and the optical member 24 by supporting the optical member 24 with the supports struts 18 of the resin. It should be noted that in view of efficiency in the use of light, it is desirable that the resin that is applied be white in color.

Modification of Embodiment 4

Figure 11:
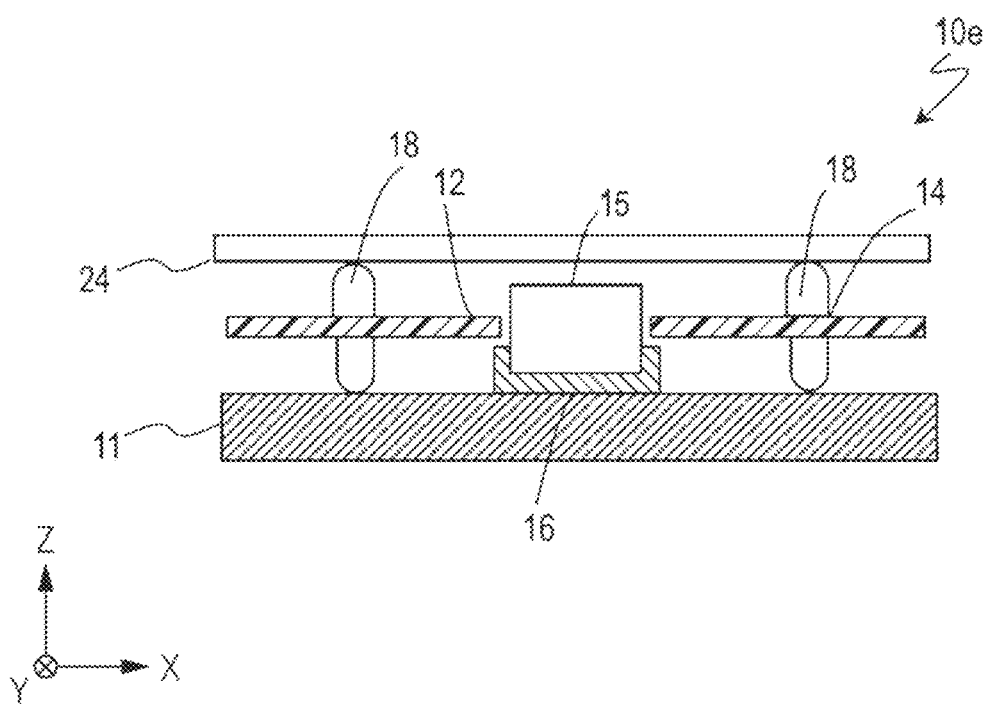
FIG. 11 is a schematic plan view showing a configuration of main components of a lighting device according to a modification of Embodiment 4 of the present invention.

In the support forming method described in Embodiment 4, the support openings 14 are provided in the reflective sheet 12 so that supports can be formed simply by applying resin onto one side of the reflective sheet 12. Alternatively, as shown in FIG. 11, a lighting device 10e provided with support struts 18 serving as supports can be made by applying resin to the same positions on the upper and lower surfaces of the reflective sheet 12 instead of providing the support openings 14.

Embodiment 5

Figure 12:
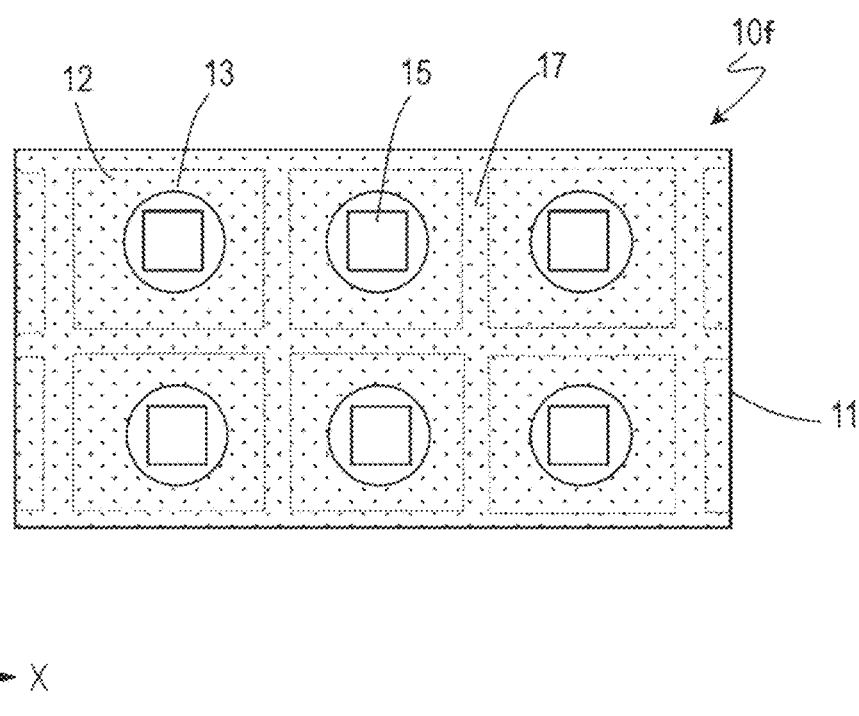
FIG. 12 is a schematic plan view showing a configuration of main components of a lighting device according to Embodiment 5 of the present invention.

A lighting device of the present embodiment is described with reference to FIG. 12. FIG. 12 is a schematic plan view showing a configuration of main components of a lighting device according to the present embodiment.

As shown in FIG. 12, a lighting device 10f can be made so that a resin 17 made of resin applied onto the back side of the reflective sheet 12 in the first embodiment takes the form of a grid.

Such a support 17 taking the form of a grid projection obtained by a grid arrangement of resin makes it possible to improve rigidity of the backlight by preventing a deformation, such as a deflection, of the reflective sheet 12.

REFERENCE SIGNS LIST 10, 10a to 10f Lighting device
20 Liquid crystal display panel (display panel)
11 LED substrate
12 Reflective sheet
13 LED opening
14 Support opening
15 LED
16 Solder
17 Support (adhesive ink, printing adhesive material)
18 Support strut (support)
19 Solder resist
21, 22 Optical sheet
23 Diffusion sheet
24 Optical member
25 Transparent protective member
30 Frame
40 Template
100 Liquid crystal display device (display device)

The invention claimed is:

1. A lighting device comprising:
a plurality of LEDs;
an LED substrate mounted with the plurality of LEDs;
a reflective sheet having a plurality of LED openings in which the plurality of LEDs are disposed, respectively, and having a metal film on a surface of the reflective sheet opposite to a surface of the reflective sheet that faces the LED substrate; and
a support that supports the reflective sheet at a higher position than a height of solder firmly fixed to terminal areas of the LEDs that face the LED substrate.

2. The lighting device according to claim 1, wherein the support is formed on the surface of the reflective sheet that faces the LED substrate.

3. The lighting device according to claim 1, wherein the support is formed on a surface of the LED substrate that faces the reflective sheet.

4. The lighting device according to claim 3, wherein the support is constituted by part of a resist formed on a surface of the LED substrate that faces the reflective sheet or constituted a member separate from the resist formed on the surface of the LED substrate that faces the reflective sheet.

5. The lighting device according to claim 3, further comprising an optical member,
wherein the reflective sheet has a plurality of support openings, and
the support includes at least two types of supports of different heights including supports of a higher height that pass through the support openings and support the optical member and supports of a lower height that support the reflective sheet.

6. The lighting device according to claim 1, further comprising an optical member,
wherein the reflective sheet has a plurality of support openings,
the support passes through the support openings,
projects from the surface of the reflective sheet that faces the LED substrate and the surface of the reflective sheet opposite to the surface, and is fixed to the reflective sheet, and
a support projecting from the surface of the reflective sheet opposite to the surface of the reflective sheet that faces the LED substrate supports the optical member.

7. The lighting device according to claim 1, further comprising an optical member,
wherein the support projects from identical positions on the surface of the reflective sheet that faces the LED substrate and the surface of the reflective sheet opposite to the surface and is fixed to the reflective sheet, and
a support projecting from the surface of the reflective sheet opposite to the surface of the reflective sheet that faces the LED substrate supports the optical member.

8. The lighting device according to claim 1, wherein the support is adhesive ink or a printing adhesive material.

9. The lighting device according to claim 1, wherein the support takes a form of a columnar projection.

10. The lighting device according to claim 1, wherein the support takes a form of a grid projection.

11. A display device comprising:
the lighting device according to claim 1; and
a display panel.

* * * * *